United States Patent
Miyake et al.

(10) Patent No.: US 10,220,459 B2
(45) Date of Patent: Mar. 5, 2019

(54) WIRE ELECTRIC DISCHARGE MACHINING APPARATUS AND MANUFACTURING METHOD FOR THIN PLATE AND MANUFACTURING METHOD FOR SEMICONDUCTOR WAFER USING WIRE ELECTRIC DISCHARGE MACHINING APPARATUS

(71) Applicant: Mitsubishi Electric Corporation, Chiyoda-ku (JP)

(72) Inventors: Hidetaka Miyake, Tokyo (JP); Atsushi Itokazu, Tokyo (JP); Takashi Hashimoto, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 451 days.

(21) Appl. No.: 14/783,970

(22) PCT Filed: Feb. 28, 2014

(86) PCT No.: PCT/JP2014/055153
§ 371 (c)(1),
(2) Date: Oct. 12, 2015

(87) PCT Pub. No.: WO2014/188754
PCT Pub. Date: Nov. 27, 2014

(65) Prior Publication Data
US 2016/0059338 A1    Mar. 3, 2016

(30) Foreign Application Priority Data

May 20, 2013    (JP) ................... 2013-106494

(51) Int. Cl.
*B23H 7/02*   (2006.01)
*B23H 7/10*   (2006.01)
*B23H 1/02*   (2006.01)

(52) U.S. Cl.
CPC ............... *B23H 7/105* (2013.01); *B23H 7/02* (2013.01); *B23H 1/028* (2013.01)

(58) Field of Classification Search
CPC . B23H 1/02; B23H 1/04; B23H 1/028; B23H 7/02; B23H 7/08; B23H 7/10; B23H 7/105; B23H 7/107
See application file for complete search history.

(56) References Cited

U.S. PATENT DOCUMENTS

2007/0108173 A1* 5/2007 Zamuner ................ B23K 9/287
                                                                  219/137.31
2012/0312787 A1    12/2012 Nakagawa et al.
2013/0284983 A1    10/2013 Okamoto et al.

FOREIGN PATENT DOCUMENTS

JP    8-336728 A    12/1996
JP    2000-94221 A    4/2000
(Continued)

OTHER PUBLICATIONS

Office Action dated Apr. 26, 2016 in Japanese Patent Application No. 2015-518121 (with English language translation).
(Continued)

*Primary Examiner* — Brian W Jennison
(74) *Attorney, Agent, or Firm* — Oblon, McClelland, Maier & Neustadt, L.L.P.

(57) ABSTRACT

To perform highly accurate cutting according to stable power feed from a machining power supply, a wire electric discharge machining apparatus includes a wire wound over main guide rollers a plurality of times to simultaneously perform a plurality of kinds of cutting. Wire laying work for a plurality of the wires on power feed elements is reduced, uniform power is fed to cutting wire sections, stable machining is intended, and according to alignment positions, for each of units, a plurality of the power feed elements are aligned to correspond to a wire parallel arrangement interval
(Continued)

of the cutting wire sections set as power feed targets and are disposed to feed power to the cutting wire sections with an interval of at least every other cutting wire section.

10 Claims, 9 Drawing Sheets

(56) References Cited

FOREIGN PATENT DOCUMENTS

| JP | 2011062764 A1 * | 9/2009 |
|----|----|----|
| JP | 2010-5735 A | 1/2010 |
| JP | 2011-62764 A | 3/2011 |
| JP | 2011-140088 A | 7/2011 |
| JP | 2013-226632 A | 11/2013 |
| WO | WO 2011/125656 A1 | 10/2011 |

OTHER PUBLICATIONS

International Search Report dated Apr. 1, 2014 in PCT/JP14/055153 Filed Feb. 28, 2014.

* cited by examiner

FIG.5
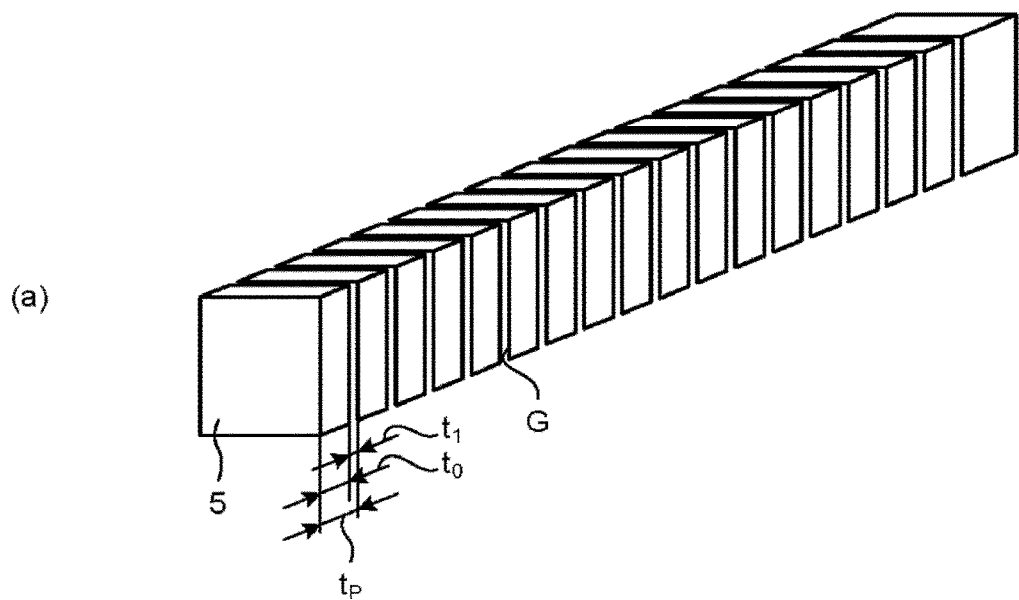
(a)
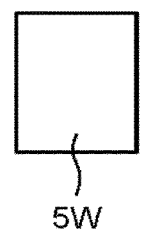
(b)

FIG.8
(a) 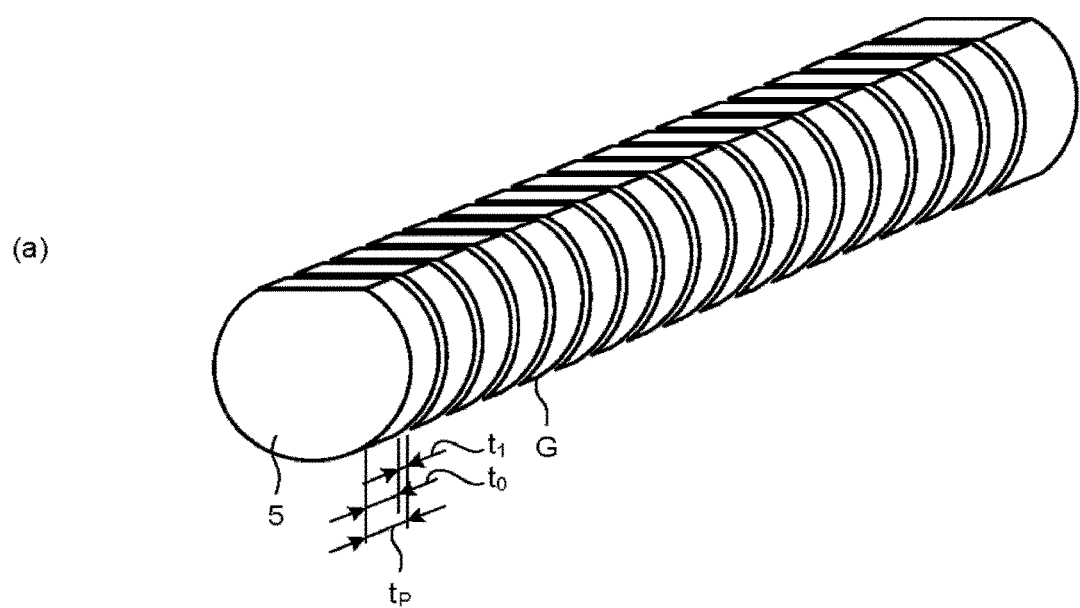
(b) 

WIRE ELECTRIC DISCHARGE MACHINING APPARATUS AND MANUFACTURING METHOD FOR THIN PLATE AND MANUFACTURING METHOD FOR SEMICONDUCTOR WAFER USING WIRE ELECTRIC DISCHARGE MACHINING APPARATUS

FIELD

The present invention relates to a wire electric discharge machining apparatus and a manufacturing method for a thin plate and a manufacturing method for a semiconductor wafer using the wire electric discharge machining apparatus.

BACKGROUND

In manufacturing a wafer having a thin plate shape from a columnar workpiece through cutting using wire electric discharge machining, in order to improve productivity of the cutting, there has been proposed a system for repeatedly winding one wire over a plurality of guide rollers to simultaneously perform machining using a large number of wires. In a wire electric discharge machining apparatus of this system, cutting wire sections in which wires are disposed in parallel at a fixed pitch are formed, the cutting wire sections are brought close to a workpiece and power is fed individually to the respective wires, which configure the cutting wire sections, using power feed elements to cause electric discharge simultaneously and in parallel between the cutting wire sections and the work piece and perform the cutting in parallel in a plurality of places (see, for example, Patent Literature 1).

CITATION LIST

Patent Literature

Patent Literature 1: Japanese Patent Application Laid-Open No. 2000-94221

SUMMARY

Technical Problem

In the wire electric discharge machining apparatus explained above, to feed power from individual machining power supplies to the respective wires configuring the cutting wire sections, the power feed elements are separated and independent from one another and electrically insulated from one another. To electrically insulate the power feed elements from each other, insulating materials are interposed respectively between each of the power feed elements. An aligning bar that pierces through a plurality of power feed elements to align the positions of the power feed elements is made of a nonconductive material. Alternatively, coating of a nonconductive substance is applied to the surfaces of the power feed elements, whereby the power feed elements are assembled without being in contact with each other and without electrically conducting with each other. In this case, the respective power feed elements are assembled to be aligned to correspond to a parallel arrangement interval of the wires of the cutting wire sections set as power feed targets. Then, when the wire is laid in a groove for laying the wire of a certain power feed element, the wires corresponding to the other parallel power feed elements are also laid on the power feed elements. Therefore, in the assembling of the power feed elements, intervals between each of the power feed elements are finely adjusted through adjustment of the intervals between the power feed elements by insertion objects such as the insulating materials interposed between each of the power feed elements and adjustment of a tightening amount in a state in which the aligning bar for aligning the power feed elements is pierced through the power feed elements. However, in the assembling of the power feed elements, whereas the interval between the adjacent wires configuring the cutting wire sections is approximately several hundred micrometers, ten or more micrometers to several tens or less micrometers is requested as an allowance for fluctuation in the adjacent wire interval. Therefore, to align the power feed elements at such high accuracy, an advanced power feed element assembly technology and an inspection technology for accurately measuring the distance between the adjacent assembled power feed elements are necessary. It is not easy to finely adjust the alignment interval of the power feed elements in a machining site.

The present invention has been devised in view of the above and it is an object of the present invention to obtain a wire electric discharge machining apparatus that can perform highly accurate cutting and has high machining reliability because power feed is stably performed from a machining power supply and a manufacturing method for a thin plate and a manufacturing method for a semiconductor wafer using the wire electric discharge machining apparatus.

Solution to Problem

In order to solve the aforementioned problems, a wire electric discharge machining apparatus includes: a pair of guide rollers in parallel at intervals; one wire wound a plurality of times between the pair of guide rollers while being spaced apart at a fixed pitch, the one wire traveling according to rotation of the guide rollers and forming a plurality of parallel wire sections spaced apart from each other between the pair of guide rollers; a pair of damping guide rollers provided between the pair of guide rollers, the pair of damping guide rollers respectively following and coming into contact with the parallel wire sections to form damped cutting wire sections; power feed element units including a plurality of power feed elements aligned to correspond to a wire parallel arrangement interval of the cutting wire sections set as power feed targets, the power feed elements respectively coming into contact with the parallel wire sections and feeding power, the power feeding elements adjacent to each other being arrayed to feed power to the parallel wire sections with an interval of at least every other parallel wire section; and a machining power supply that applies a voltage between the power feed elements and the wire to cause electric discharge.

Advantageous Effects of Invention

According to the present invention, the wire electric discharge machining apparatus includes the power feed element units including the power feed elements that are aligned to correspond to the wire parallel arrangement interval of the cutting wire sections set as power feed targets and respectively come into contact with the parallel wire sections and feed power to the parallel wire sections. The power feed elements adjacent to each other are arrayed to feed power to the parallel wire sections with an interval of at least every other parallel wire section. Therefore, a wraparound amount of a feed current to the adjacent wire is large. A wraparound current to the wire adjacent to the adjacent wire, that is, the wire next but one suddenly decreases. Therefore, power is fed at an interval of one or more wires. It is possible to reduce the influence of the wraparound current (a leak current) on the machining. Alignment accuracy between each of the power feed elements is improved. It is possible to prevent positional deviation with respect to the parallel wires from easily occurring and improve machining accuracy in machining thin plates simultaneously from a workpiece. There is an effect that it is possible to facilitate assembling and adjustment of the power feed elements, simplify machining arrangement, and reduce a machining preparation time.

BRIEF DESCRIPTION OF DRAWINGS

FIG. 5 is a diagram showing a state of machining performed using the wire electric discharge machining apparatus in the first embodiment of the present invention, wherein (a) is a diagram showing a state during the machining and (b) is a diagram showing one wafer after the machining.

FIG. 8 is a diagram showing a state of machining performed using the wire electric discharge machining apparatus in the second embodiment of the present invention, wherein (a) is a diagram showing a state during the machining and (b) is a diagram showing one wafer after the machining.

DESCRIPTION OF EMBODIMENTS

Exemplary embodiments of the present invention are explained in detail below with reference to the drawings. Note that the present invention is not limited by the embodiments. Apparatuses explained in the embodiments are schematic. The sizes, ratios, and the like of components are sometimes different from real ones.

First Embodiment

Figure 1:
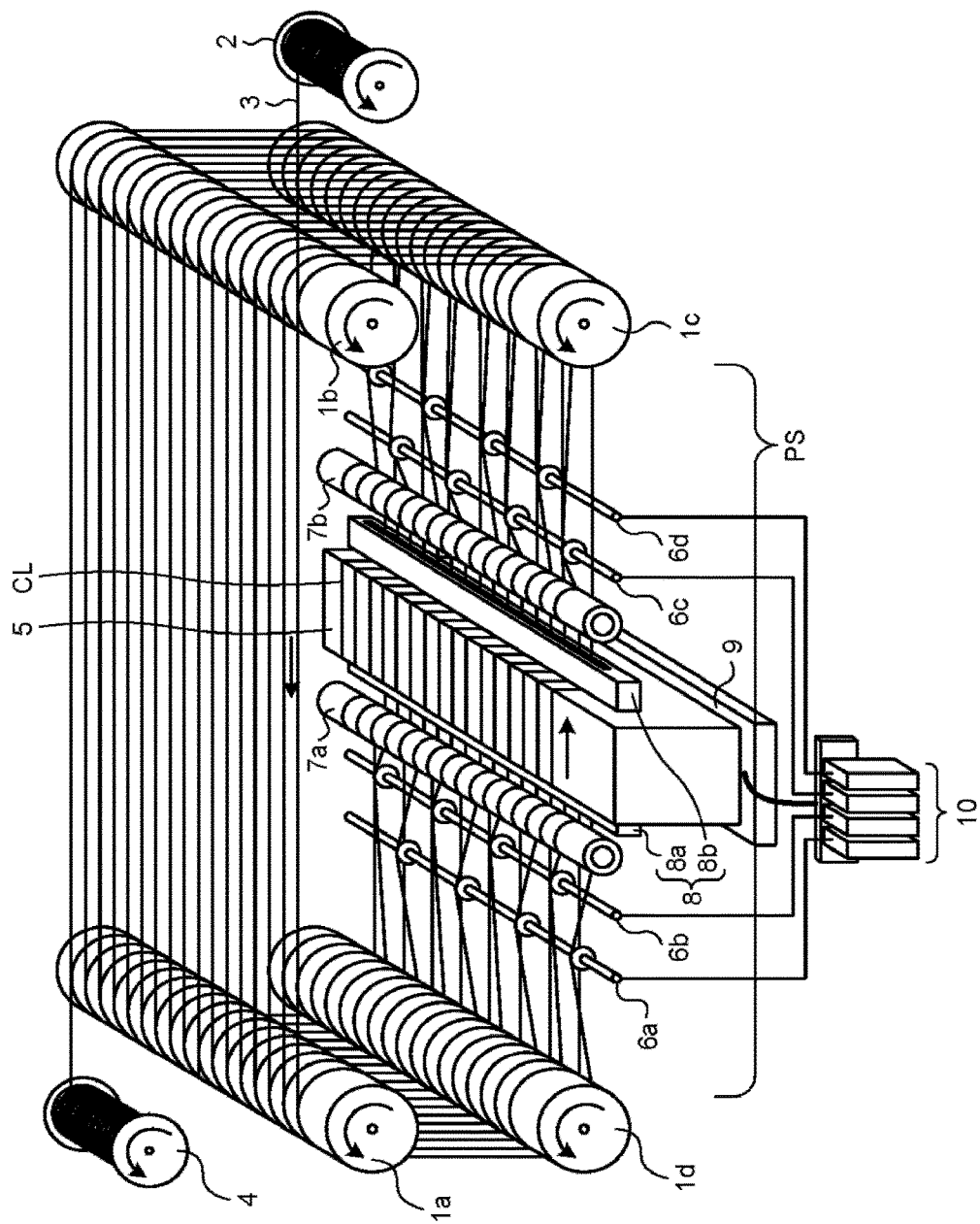
FIG. 1 is a perspective view showing the overall configuration of a wire electric discharge machining apparatus in a first embodiment of the present invention.

FIG. 1 is a side view showing the configuration of a main part of a wire electric discharge machining apparatus according to a first embodiment of the present invention. The wire electric discharge machining apparatus in the first embodiment includes four main guide rollers 1a to 1d, one wire 3 that is wound a plurality of times around the main guide rollers 1a to 1d at a fixed pitch to form a parallel wire section PS between a pair of main guide rollers 1c and 1d and travels according to rotation of the main guide rollers 1a to 1d, a pair of damping guide rollers 7a and 7b that follows and comes into contact with the parallel wire section PS and forms a plurality of cutting wire sections CL for damping, power feed elements (power feed element units 6a to 6d) that respectively feed power to the cutting wire sections CL, a wire bobbin 2 and a wire winding bobbin 4, and means for moving a workpiece 5 relatively to the cutting wire sections CL in a parallel direction of the wire 3 configuring the cutting wire sections CL and a direction perpendicular to the parallel direction of the wire configuring the cutting wire sections CL. A plurality of integrally molded power feed elements configure two pairs of power feed element units 6a and 6b and 6c and 6d electrically connected to each other. The power feed element units include power feed element holders 60a and 60b for respective pairs (not shown in FIG. 1) including shaft end supporting sections at both ends and are capable of performing position control (FIGS. 3(a) and 3(b)). A machining power supply 10 applies a voltage between the plurality of power feed elements (the power feed element units 6a to 6d) and the wire 3 and causes electric discharge. The power feed elements (the power feed element units 6a to 6d) are aligned to correspond to a wire parallel arrangement interval of the cutting wire sections CL set as power feed targets. The machining power supply feeds power to the power feed element units 6a to 6d disposed to feed power to the cutting wire sections CL with an interval of every three cutting wire section. The power feed elements aligned in the same power feed element units 6a to 6d are electrically connected to one another.

The main guide rollers 1a to 1d are main guide rollers configuring a wire traveling system. In the wire electric discharge machining apparatus, four main guide rollers having the same diameter are disposed in parallel to and at intervals from one another. One wire 3 let out from the wire bobbin 2 sequentially extend over the four main guide rollers 1a to 1d and is repeatedly wound while being spaced apart at a fixed pitch. The wire 3 travels according to rotation of the main guide rollers 1a to 1d and finally reaches the wire winding bobbin 4. The main guide rollers 1c and 1d are set in positions across the workpiece 5. The wire 3 is stretched with fixed tension between both the main guide rollers, whereby a plurality of parallel wire sections PS spaced apart in the axial direction of the main guide roller from each other are configured. Note that, in this specification, the parallel wire sections PS indicate a portion from the let-out of the wire 3 from the main guide roller 1d to the winding of the wire 3 on the main guide roller 1c. In the parallel wire sections PS, linearly stretched regions including portions opposed to the workpiece 5 are the cutting wire sections CL. FIG. 1 shows a state in which cutting of the workpiece 5 is started and the cutting wire sections CL have advanced to the inside of the workpiece 5.

The power feed element units 6a to 6d disposed in contact with the parallel wire sections PS are electrodes that supply voltage pulses to the cutting wire sections CL. In FIG. 1, the power feed element units 6a to 6d are disposed in two rows on each of both sides of the workpiece 5. The damping guide rollers 7a and 7b are disposed in positions closer to the cutting wire sections CL from the power feed element units 6a to 6d on the parallel wire sections PS. A state in which the wire 3 is always laid in grooves for wire guide formed on the surfaces of the damping guide rollers 7a and 7b is maintained to guide the wire 3. That is, the damping guide rollers 7a and 7b are guide rollers that are provided between a pair of main guide rollers, respectively follow and come into contact with the parallel wire sections PS, and have a small diameter compared with the main guide rollers. The damping guide rollers 7a and 7b support the wire 3 such that the wire 3 present in the cutting wire sections CL is linearly stretched. Wire vibration of the cutting wire sections CL between the damping guide rollers 7a and 7b is suppressed. A traveling position of the cutting wire sections CL is substantially in a standstill state. Further, nozzles 8 (8a and 8b) are disposed in positions across the cut wires sections CL. Machining liquid is jetted from the nozzles 8a and 8b, which are disposed to be opposed to each other, toward a cut section of the workpiece 5 along the cutting wire sections CL. The cutting wire sections CL thread through the nozzles 8a and 8b such that they do not come into contact with the inner surfaces of the nozzles. A stage 9 is a table that carries the workpiece 5 and moves up and down.

In FIG. 1, the wire 3 is wound only in a part (approximately ¼) of a roller outer circumference in each of the four main guide rollers 1a to 1d and is turned around the entire four main guide rollers 1a to 1d. The main guide rollers 1a to 1d are configured to form a route from the wire bobbin 2 to the wire winding bobbin 4 and secure a space for the workpiece 5 to pass the cutting wire sections CL. The main guide rollers 1c and 1d are often driving guide rollers. The main guide rollers 1a and 1b disposed above the main guide rollers 1c and 1d are often driven guide rollers. Rotating shafts of the driving guide rollers are directly connected to a rotating shaft of a motor by belts or the like, whereby a rotating force is transmitted to the driving guide rollers to drive the driving guide rollers. On the other hand, in the driven guide rollers, a driving force by rotation of the motor is not generated. The driven guide rollers rotate with friction of the wire 3 in accordance with the traveling of the wound wire 3. The damping guide rollers 7a and 7b are driven guide rollers disposed in contact with the parallel wire sections PS. The damping guide rollers 7a and 7b are driven according to the traveling of the wire 3 to rotate.

In FIG. 1, arrows drawn around the shafts of the main guide rollers 1a to 1d indicate a rotating direction of the main guide rollers 1a to 1d. An arrow drawn along the wire 3 indicates a traveling direction of the wire 3. The main guide rollers 1a to 1d are rollers in which, for example, urethane rubber is wound around columnar-cored bars. The main guide rollers 1a to 1d are formed in a rotatable structure with both ends of the cored bars supported by bearings. The urethane rubber is suitable for preventing the wire 3 from slipping on the guide rollers because the urethane rubber has a high coefficient of friction with the wire 3. On the roller surfaces of the main guide rollers 1a to 1d in contact with the wire 3, a plurality of grooves are formed at an interval same as a wire winding pitch. The wire 3 is wound in the respective grooves. In this case, the distance (a winding pitch) between the cutting wire sections CL disposed in parallel at an equal interval is fixed. In the case of a semiconductor wafer, the distance is, for example, approximately 0.1 millimeter to 0.8 millimeter. In the driving main guide rollers, force for pulling the wire can be obtained. In the driven main guide rollers, a rotating force for rotating the rollers can be obtained. The guide rollers and the workpiece 5 are immersed in machining liquid. The cutting wire sections CL are opposed to the workpiece 5 in the machining liquid and perform cutting simultaneously and in parallel.

The damping guide rollers 7a and 7b are driven guide rollers and are guide rollers having high shape accuracy, rotation accuracy, and attachment accuracy compared with the main guide rollers 1a to 1d. Two damping guide rollers 7a and 7b are used in positions across the workpiece 5. The damping guide rollers 7a and 7b are pushed against the stretched parallel wire sections PS such that the wire 3 is laid in a part of the outer circumferences of the damping guide rollers 7a and 7b. As a result, the wire 3 between the damping guide rollers 7a and 7b is linearly stretched. The wire 3 is bent in the traveling direction. During the traveling of the wire 3, a state in which the wire 3 is laid on the damping guide rollers 7a and 7b is always maintained. The wire 3 vibrating before being laid on the damping guide roller 7b is surely laid on the damping guide roller 7b. Therefore, the vibration of the wire 3 traveling with vibration is interrupted. Similarly, vibration applied to the wire 3 let out from the damping guide roller 7a is interrupted by the damping guide roller 7a. As a result, the two damping guide rollers 7a and 7b create, while rotating with the frictional force with the wire 3 according to the wire traveling, a state in which wire vibration hardly occurs in a linear region between the damping guide rollers 7a and 7b. That is, with the damping guide rollers 7a and 7b, it is possible to suppress vibration propagation from the main guide rollers 1a to 1d to the cutting wire sections CL and precisely guide the wire 3 such that a microscopic traveling position is fixed.

The damping guide rollers 7a and 7b bend the traveling direction of the wire 3 extending to the cutting wire sections CL but do not have action of securing a space for the workpiece 5 to pass the cutting wire sections CL. On the roller surface in contact with the wire 3, V-shaped grooves GW for wire guide at an interval same as the interval of the cutting wire sections CL are present. One wire 3 is laid in each of the grooves GW.

Figure 2:
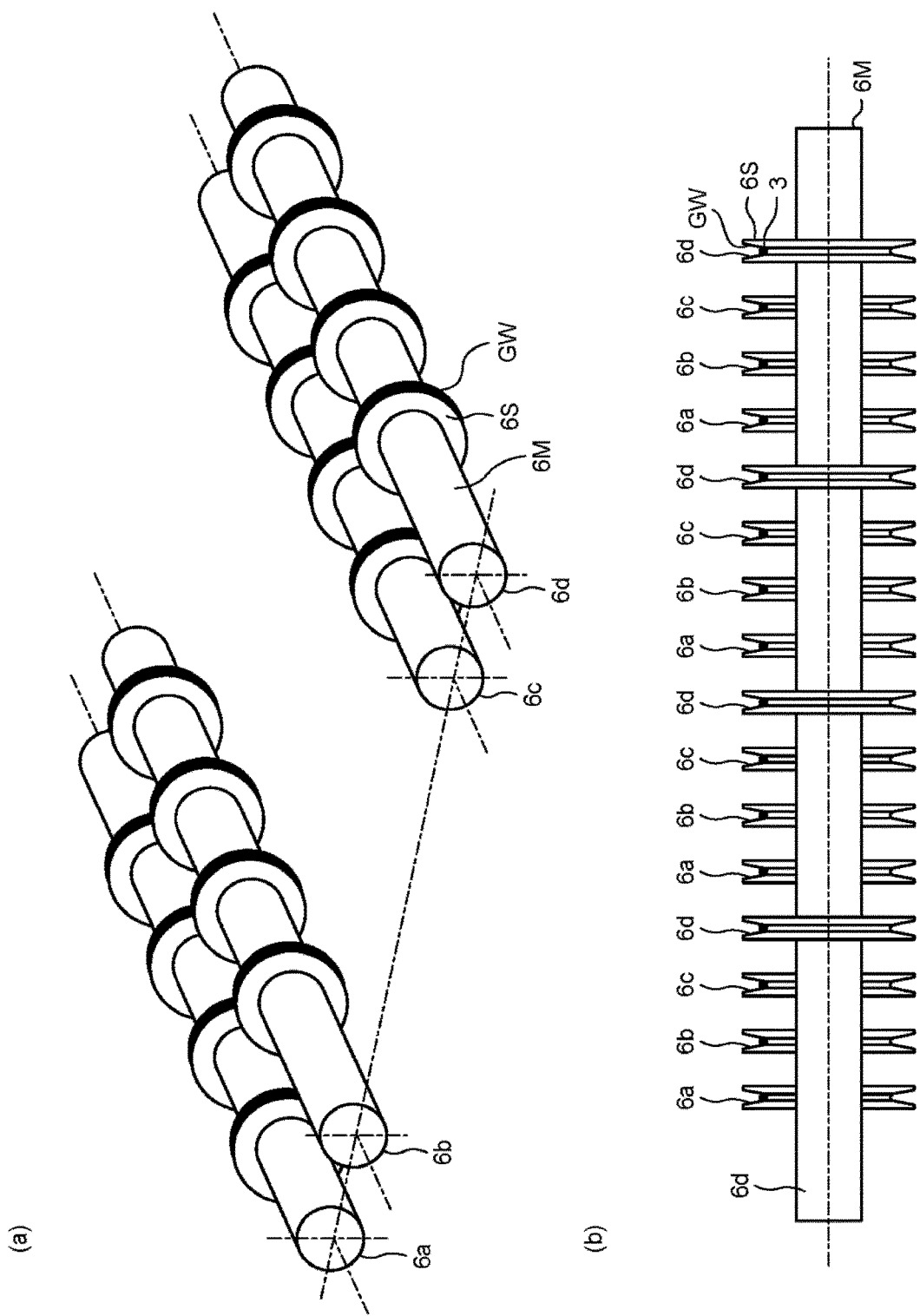
FIG. 2 is a configuration diagram schematically showing power feed elements of the wire electric discharge machining apparatus in the first embodiment of the present invention.

As shown in FIG. 2(a), the power feed element units 6a to 6d, which feed machining power to the cutting wire sections CL, are formed in a shape in which two kinds of columns having different diameters and different heights are alternately stacked with the centers of circles, which are equivalent to bottom surfaces of the columns, aligned. The power feed element units 6a to 6d include a shaft section 6M, which is a columnar portion having a smaller diameter, and power feed sections 6S formed at a predetermined interval in the shaft section 6M, formed by a columnar portion having a diameter larger than the shaft section, and having the V-shaped grooves GW for wire guide on outer circumferential surfaces. The V-shaped grooves GW for wire guide are portions in contact with the power feed target wire 3. The shaft section 6M, which is the columnar portion having the smaller diameter, is a portion that allows the wire 3 that is not set as the power feed target to escape so as not to come into contact with the power feed element units. The power feed element units 6a to 6d are disposed in parallel to one another in the length direction and such that column center positions are at the same height. The power feed sections 6S, which are the column portions having the larger diameter, of the power feed element units 6a to 6d equal to or more than the number of the cutting wire sections CL are disposed at an interval equal to an interval of adjacent wires configuring the cutting wire sections CL. FIG. 2(b) is a diagram of the power feed element unit 6d shown in FIG. 2(a) viewed from right beside in the side direction. In FIG. 2(b), a state is schematically shown in which the power feed element units 6a, 6b, and 6c overlap the power feed element unit 6d located in the front-most position, the shaft section 6M, which is the columnar portion having the smaller diameter, is hidden, the power feed sections 6S, which are the columnar portions having the larger diameter, of each of the power feed element units are aligned at an equal interval because the power feed sections 6S do not overlap those of the other power feed element units, and the wires 3 of the cutting wire sections CL are laid in the V-shaped grooves GW for wire guide machined on the side surfaces of the power feed sections 6S, which are the columnar portions having the larger diameter. The power feed element units are disposed to feed power to the wires 3 with an interval of every three wire 3. Therefore, even when abnormal electric discharge occurs because of the power feed element side, the abnormal electric discharge occurs in a spaced-apart position and damage to the wires due to friction can be dispersed.

The power feed element units 6a to 6d are easily integrally molded by lathe turning using, as starting materials, columnar members having a diameter equal to or larger than the diameter of the power feed sections 6S, which are the columnar portions having the larger diameter. With an NC lathe, it is possible to highly accurately machine a pitch at which the power feed sections 6S, which are the columnar portions having the larger diameter, and the shaft section 6M, which are the columnar portions having the smaller diameter, are alternately disposed. Further, it is also easy to highly accurately machine the V-shaped grooves GW for wire guide formed on the side surfaces of the columns having the larger diameter. Alternatively, it is possible to manufacture a large volume of the highly accurate power feed element units 6a to 6d through compression molding and sintering of conductive materials injected into molds of the power feed element units 6a to 6d. As a material of the power feed element units 6a to 6d, it is desirable to use a conductive material excellent in abrasion resistance such as a cemented carbide alloy.

Figure 3:
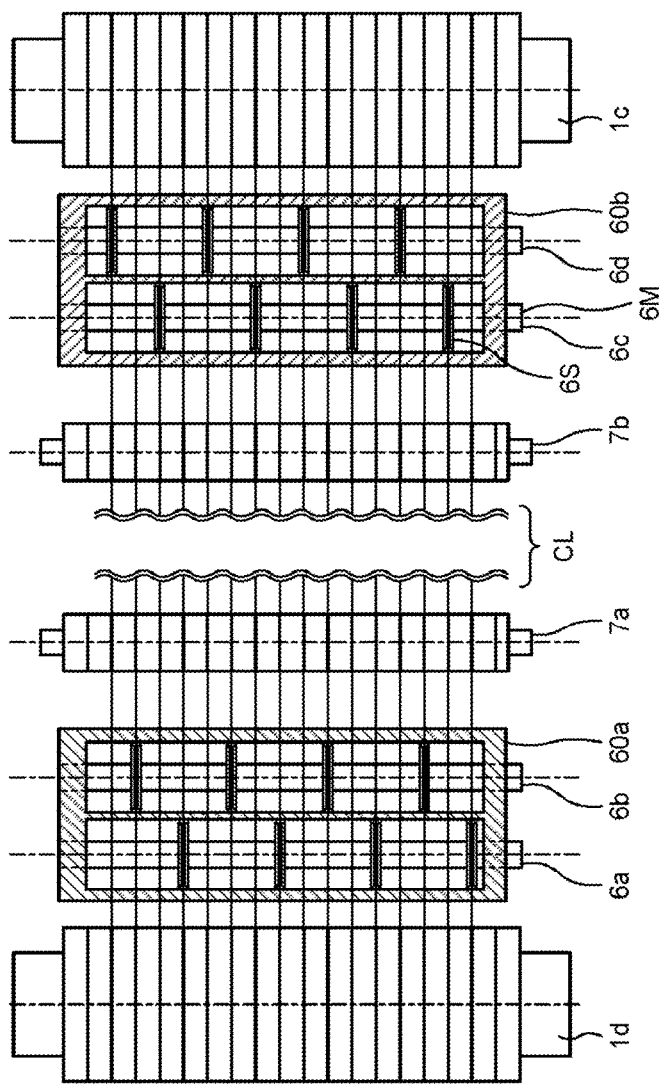
FIG. 3 is a diagram showing an arrayed state of the power feed elements of the wire electric discharge machining apparatus in the first embodiment of the present invention and a power feed state to parallel wire sections, wherein (a) is a top view and (b) is a side view.

The power feed element units 6a to 6d are disposed at intervals not to come into contact with one another and are electrically insulated from one another. In FIG. 1, the power feed element units 6a to 6d are disposed in two rows on each of both sides of the workpiece 5. The power feed element units 6a to 6d are disposed to be housed in power feed element holders 60a and 60b (not shown in FIG. 1) such that the power feed element units 6a and 6b and the power feed element units 6c and 6d do not come into contact with each other. FIG. 3(*a*) is a top view of the disposition between the main guide rollers 1d and 1c shown in FIG. 1 viewed from above. However, the workpiece 5 and the nozzles 8a and 8b on both the sides of the workpiece 5 are not shown. The power feed element units 6a and 6b are housed in the power feed element holder 60a. The power feed element units 6c and 6d are housed in the power feed element holder 60b. The power feed element holders 60a and 60b have the same shape. Concerning the stored power feed element units 6a, 6b, 6c, and 6d, the lengths of the shaft section 6M, which is the columnar portion having the smaller diameter, are respectively different at end portions. The lengths of the end portion of the shaft section 6M, which is the columnar portion having the smaller diameter, are different because the end portions of the power feed element units 6a and 6b are stored to be aligned with the reference surfaces of the power feed element holders 60a and 60b to adjust in advance the wire power feed portions, that is, the power feed sections 6S made of the columnar portions having the larger diameter of the power feed element units 6a and 6b to correspond to the wires of the cutting wire sections CL. As a result, it is possible to align the power feed element portions at a predetermined pitch simply by fitting the power feed element units 6a to 6d in the power feed element holders 60a and 60b.

When electric discharge machining is performed, after the workpiece 5 is disposed to be opposed to the cutting wire sections CL at a predetermined inter-pole distance apart therefrom while rotating the main guide rollers 1c and 1d to cause the wire 3 to travel, a voltage pulse is applied to the cutting wire sections CL to lift the stage 9 according to cutting speed. By relatively moving the parallel wire sections PS and the workpiece 5 in a state in which the inter-pole distance is kept fixed, as in a state during machining shown in FIG. 5(*a*), arc discharge is continued. Machining grooves G are formed to correspond to routes of passage of the cutting wire sections CL in the workpiece 5. Therefore, as shown in FIG. 5(*b*), thickness $t_0$ of a wafer 5W, which is a sliced thin plate, is length obtained by subtracting width (machining width) $t_1$ of the machining grooves G, which is a cutting margin of the workpiece 5, from a winding pitch $t_p$. A wire line diameter is desirably small to reduce the machining width. Practically, a steel wire of approximately 0.1 millimeter is often used. However, a steel wire further reduced in diameter to 0.05 millimeters or the like is sometimes used. Further, to make a discharge start voltage appropriate, coating of brass or the like can be applied to the surface of the steel wire.

To apply the voltage pulse to the cutting wire sections CL, power feed lines from the machining power supply are connected to the power feed element units 6a to 6d, the power feed element units 6a to 6d are brought into contact with the wires 3 configuring the cutting wire sections CL, and electric power is fed to the power feed element units 6a to 6d from the machining power supply 10. The power feed element units 6a to 6d are integrated molded products by shaving or the like. Therefore, in the same power feed element units, the power feed element portions (the columnar portions having the larger diameter) are electrically conduct with each other. Therefore, the power feed lines from the machining power supply 10 are connected to the power feed element units 6a to 6d, and the power feed element units 6a to 6d come into contact with the wires configuring the cutting wire sections CL and power is fed to the power feed element units 6a to 6d. However, power cannot be fed independently to the power feed elements. That is, a machining current fed to the same power feed element unit flows to the wire in which electric discharge occurs, and applied voltage drops. Therefore, in the other wires to which power is fed by the same power feed element unit, electric discharge less easily occurs simultaneously and in parallel, compared with when power is completely independently fed. However, as a result of an experiment, through actual machining, the inventors have found that, concerning the power feed element units 6a to 6d, because power is fed to the power feed element units 6a to 6d independently from one another, electric discharge occurs simultaneously and in parallel concerning the wires 3 to which power is fed by the power feed element units 6a to 6d and a marked decrease in an occurrence frequency of a discharge pulse and a marked decrease in machining speed do not occur.

On the other hand, to dispose a plurality of power feed elements in parallel at a predetermined interval of several hundred micrometers with reference to the positions of the V-shaped grooves GW for wire guide on the power feed element surfaces on which the wire 3 is laid, a dedicated apparatus that can highly accurately measure positions in the assembling of the power feed elements is necessary, and careful work is requested. The wires wound in the latter half in the cutting wire sections CL are more repeatedly used in the electric discharge machining. Therefore, more unevenness due to the electric discharge machining is formed on the surfaces of the wires. Further, a very hard workpiece melted by the electric discharge machining adheres to the surfaces again. The wires are formed as a kind of abrasion resistant coated wires. Therefore, in the power feed elements on which such wires slide, wear of power feed surfaces in contact with the wires is intense. A replacement frequency of the power feed elements varies depending on power feed target wires. In the case of the power feed element structure of Patent Literature 1, even when one power feed element is replaced, it is necessary to disassemble a plurality of power feed elements aligned at an equal interval, and thus, considerable labor is required to reassemble and adjust the power feed elements.

On the other hand, the wire electric discharge machining apparatus in this embodiment is intended to meet a high-level request for stable power feed to the wires disposed in parallel and a request concerning assembling and adjustment of the power feed elements. As explained above, the wire electric discharge machining apparatus has a characteristic that the wire electric discharge machining apparatus includes integrally molded high-precision power feed element units as a first technical element and including, as a second technical element, the power feed element holders that align and hold the power feed element units 6a to 6d. The high-precision power feed element units 6a to 6d are respectively fit and held in the power feed element holders 60a and 60b corresponding thereto. Therefore, the power feed element portions of the power feed element units 6a to 6d can be aligned to correspond to the parallel wires configuring the cutting wire sections CL. A pressing amount of the power feed element portions against the wires of the cutting wire sections CL can also be fixed. Further, the power feed element portions can be surely brought into contact with the parallel wires to feed power. The power feed elements (the power feed element units 6a to 6d) aligned by the power feed element holders 60a and 60b are aligned to correspond to a wire parallel arrangement interval of the cutting wire sections CL set as power feed targets. The machining power supply feeds power to the power feed element units 6a to 6d disposed to feed power to at least at an interval of one cutting wire sections CL (in this embodiment, three cutting wire sections CL). Therefore, even when wraparound of a power feed current to the adjacent wire is large, a wraparound current to the wire next but one is substantially reduced, and thus, it is possible to reduce the influence of the wraparound current on machining. Even when abnormal electric discharge occurs, because the abnormal discharge occurs in a spaced apart position, it is possible to disperse damage to the wires due to friction. The power feed elements aligned in the same power feed element units 6a to 6d are electrically connected to one another. Therefore, power feed is easy. In this embodiment, the power feed element units are provided in the entire width direction of the wire sections. The power feed element units are distributed at an equal interval in the entire axial direction such that all the power feed elements do not have overlapping portions in the axial direction of the entire power feed element units. The power feed element units are disposed at every fourth wire of the cutting wire section CL. With this configuration, all the power feed elements of the power feed element units uniformly feed power to the parallel wires of the parallel wire sections one by one. In this system, because the power feed elements can be easily aligned, machining arrangement is easy. A contact state of the power feed elements with the wires is not made non-uniform by an insufficient aligned state of the power feed elements. Therefore, because machining power is stably fed to all the wires, electric discharge machining does not become unstable for each of the wires.

Figure 4:
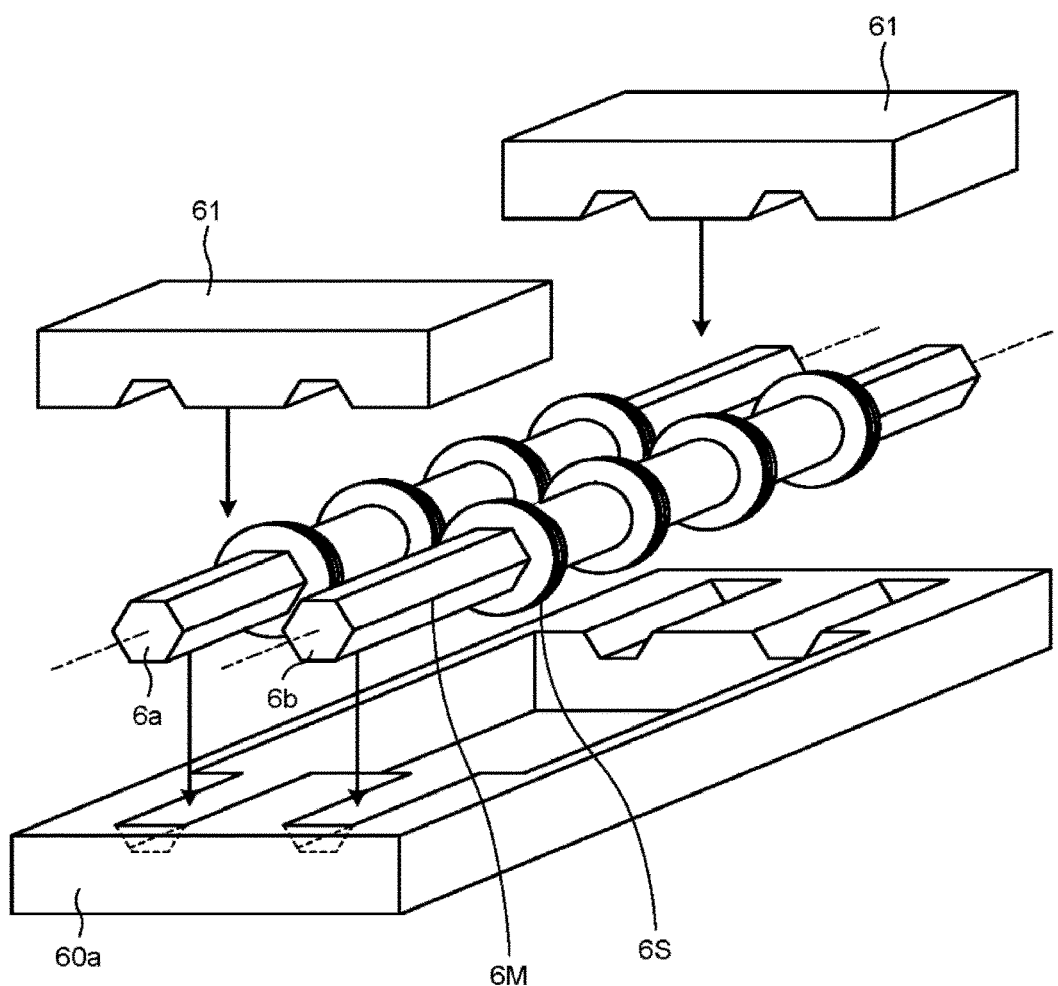
FIG. 4 is an explanatory diagram showing the structure of the power feed elements of the wire electric discharge machining apparatus in the first embodiment of the present invention.

As shown in FIG. 4, by arranging such that both shaft ends of the power feed element units 6a to 6d and bearing portions of the power feed element holders 60a and 60b, in which both the shaft ends of the power feed element units 6a to 6d are fit, are machined into, for example, a regular hexagonal shape, when the power feed element units 6a to 6d are fit in the power feed element holders 60a and 60b, the power feed element units 6a to 6d can be set in positions rotated at a fixed angle equivalent to a multiple of 60 degrees with respect to the axial direction centers of the power feed element units 6a to 6d. That is, as shown in FIG. 4, by arranging such that both the shaft ends of the power feed element units 6a to 6d and the shaft bearing portions of the power feed element holders 60a and 60b, in which both the shaft ends of the power feed element units 6a to 6d are fit, are machined into a regular N-polygonal shape (N is 3 or more), when the power feed element units 6a to 6d are fit in the power feed element holders 60a and 60b, the power feed element units 6a to 6d can be set in positions rotated at a fixed angle with respect to the axial direction centers of the power feed element units 6a to 6d. Note that only the power feed element holder 60a is shown in FIG. 4. However, the same applies to the power feed element holder 60b.

With this system, even if the power feed surfaces of the power feed element units 6a to 6d are worn by sliding friction with the cutting wire sections CL set as the power feed targets and a power feed state changes, wire contact places of the power feed element units 6a to 6d can be changed by changing the positions of both the shaft ends of the power feed element units 6a to 6d with respect to fitting portions of the power feed element holders 60a and 60b and fitting the power feed element units 6a to 6d. It is unnecessary to finely adjust the setting positions of the power feed element units 6a to 6d. It is made possible to easily replace the power feed surfaces of the power feed elements with new surfaces. A power feed element fixture 61 holds and fixes both the shaft ends of the power feed element units 6a and 6b housed in the power feed element holders 60a and 60b. The power feed element fixture 61 and the power feed element holders 60a and 60b are fastened by, for example, bolts (not shown in the figure). Although not shown in the figure, power feed wires from the machining power supply 10 are connected to the shaft end portions of the power feed element units 6a and 6b. A machining current from the machining power supply 10 is fed to the wires of the cutting wire sections CL. In FIG. 4, the power feed element holder 60a for housing the power feed element units 6a and 6b is shown in detail. However, the power feed element holder 60b for housing the power feed element units 6c and 6d has the same structure.

In the first embodiment, a wire adjacent in a winding side direction of a wire to which power is fed by the power feed element unit 6a among the wires 3 comes into contact with the power feed element unit 6c and is fed power. A wire adjacent in the winding side direction of the wire comes into contact with the power feed element unit 6b and is supplied with power, and further, a wire adjacent in the winding side direction of the wire comes into contact with the power feed element unit 6d and is supplied with power.

That is, the power feed element units 6a to 6d respectively perform power feed to the parallel wire sections PS (or the cutting wire sections CL) at an interval of four parallel wire sections PS. The four disposed power feed element units 6a to 6d are electrically insulated. The cutting wire sections CL passed the power feed element unit 6a are wound on the driving main guide roller 1c, thereafter wound on the main guide rollers 1b, 1a, and 1d, and wound on the driving main guide roller 1c again. As explained above, the power feed elements disposed in the same row are integrally molded. Therefore, independent power feed cannot be performed concerning the parallel wire sections PS fed power from the same power feed element unit.

However, even when power is independently fed to the parallel wires PS in a state in which the power feed elements are completely electrically insulated, because of the structure in which the parallel wire sections PS are configured by one wire, wraparound (leak) of an electric current fed to the adjacent wire 3 lightly occurs. A wraparound amount of a feed current to the adjacent wire is large. A wraparound current to the wire adjacent to the adjacent wire, that is, the wire next but one abruptly decreases. Therefore, concerning the wire configuring the parallel wire sections PS, there is no influence on machining due to a wraparound current (a leak current) if power is fed at intervals equivalent to four wires.

Note that, in a structure in which power feed elements are electrically conducted, the influence of wraparound of an electric current from a closest adjacent wire is the largest. Therefore, even in a structure in which the power feed element units insulate the adjacent power feed elements, that is, even when the number of power feed element units is two for enabling alternate power to feed to the wires of the parallel wire sections PS, a marked decrease in machining speed does not occur.

In the first embodiment, as shown in FIG. 2(b) and FIG. 3(a), a pitch between each of a plurality of wires affects the thickness of a wafer sliced from an ingot by wire electric discharge machining. The thickness of the sliced wafer is extremely small at approximately 0.5 millimeters. Therefore, the pitch of the wires is also extremely small. For example, for wires in currently in use having a diameter of 0.1 millimeter, the pitch is set to 0.6 millimeters. The power feed sections 6S are brought into contact with these parallel wires. In that case, V-groove machining is applied to the outer circumferential surfaces of the power feed elements such that the power feed elements surely come into contact with the wires and the wires do not come off the power feed elements. For the V-groove machining, the power feed sections 6S need to have adequate thickness. To dispose the power feed sections 6S in parallel adjacent to each other, because a wire pitch is so small that adjacent power feed elements come into contact with each other, although the power feed sections 6S formed in one power feed element row are disposed at an equal interval as shown in FIG. 3(a), by setting the power feed element rows to be regularly shifted, there is no restriction in positions of the power feed elements of the adjacent wires. Consequently, it is made possible to design the power feed sections 6S at thickness nearly twice as large as the wire pitch.

Second Embodiment

Figure 6:
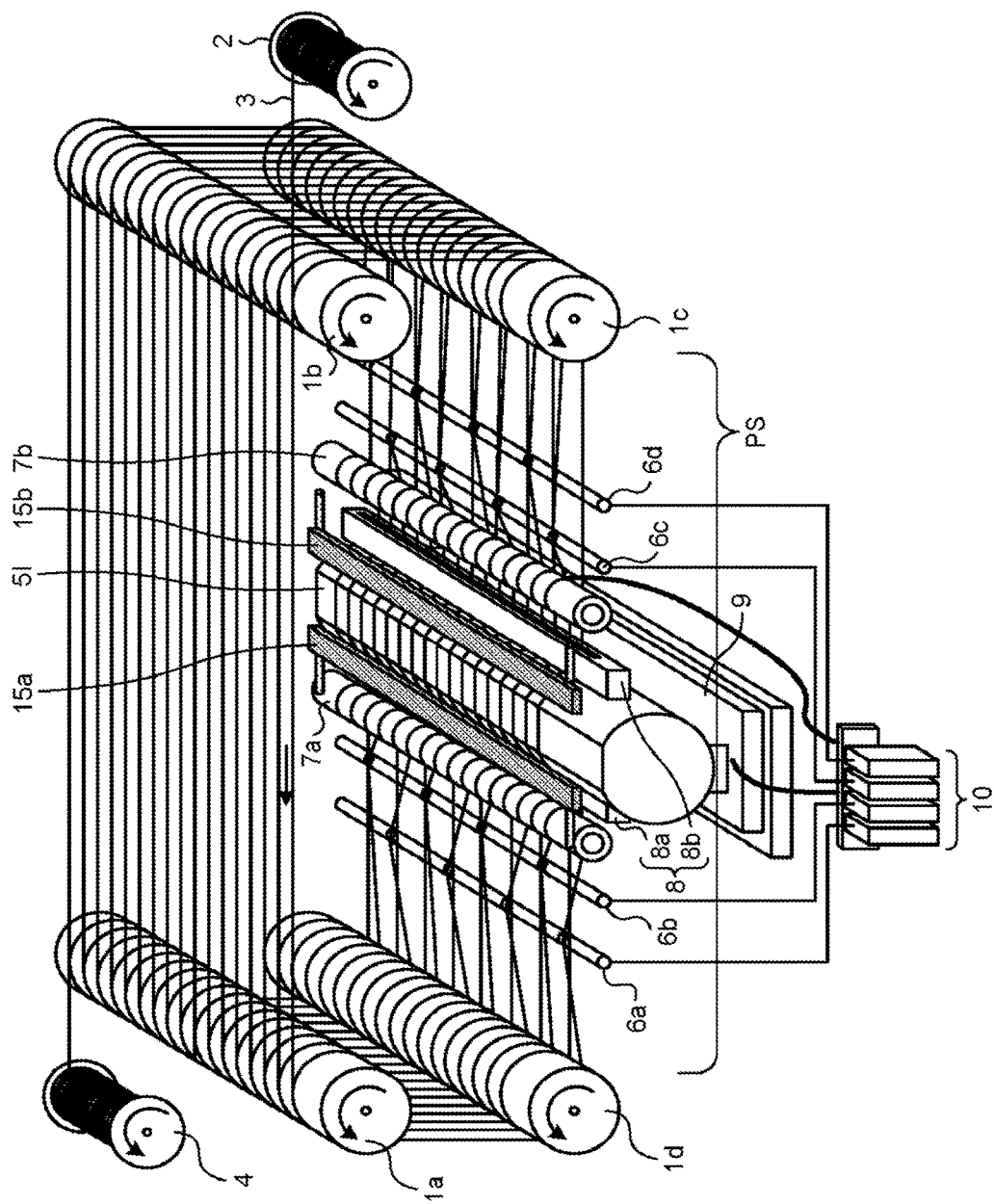
FIG. 6 is a perspective view showing the overall configuration of a wire electric discharge machining apparatus in a second embodiment of the present invention.
Figure 7:
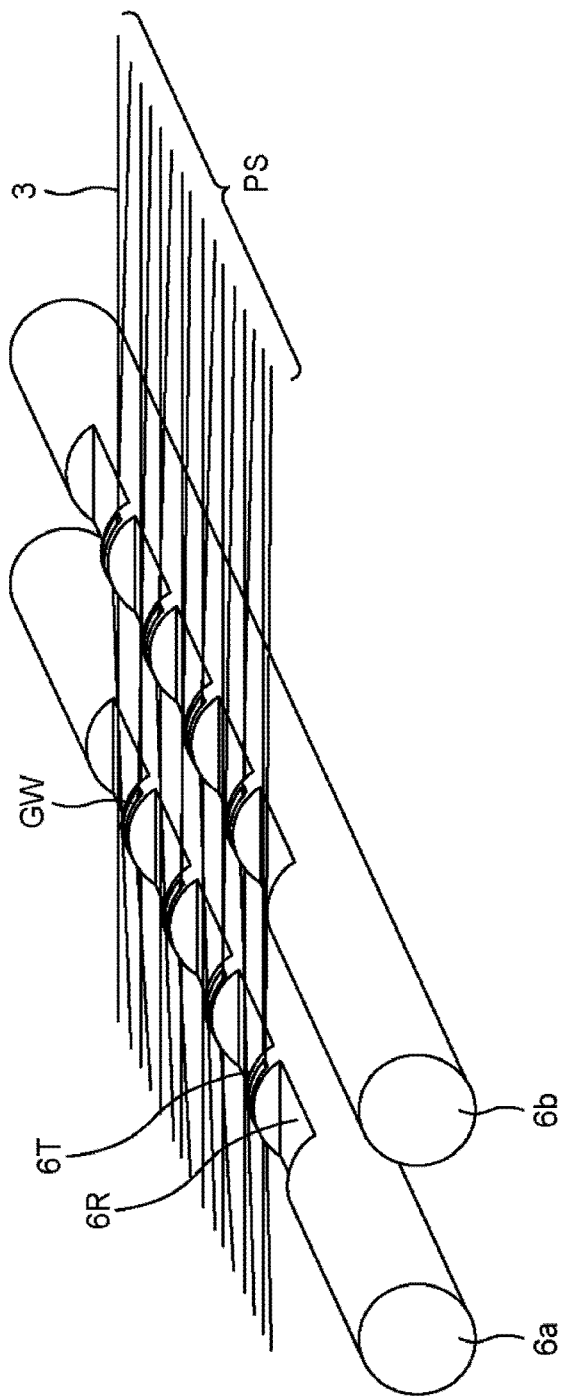
FIG. 7 is a configuration diagram schematically showing power feed elements according to the second embodiment of the present invention.

FIG. 6 is a diagram showing a wire electric discharge machining apparatus in a second embodiment. FIG. 7 is a main part enlarged perspective view of a power feed element unit of the wire electric discharge machining apparatus. This embodiment is a modification of the power feed element unit in the first embodiment. The power feed element units 6a to 6d are obtained by cutting out a side surface of a round bar of a cemented carbide alloy at fixed width at an equal interval with, for example, grindstone polishing. Cutout sections 6R chamfered in a plane shape by the cutting out are spaces for, when a part of the cutting wire sections CL pass in parallel, allowing wires to escape to cause the cutting wire sections CL to pass without coming into contact with the round bar. An un-machined portion of the round bar between two cutout portions is a portion with which power feed target wires in the cutting wire sections CL come into contact. The portions are applied with the V-shape grooves GW machining for laying the wires and feeding power and formed as power feed sections 6T. The cutting out a part of the round bar by grinding or cutting also has a power feed function to a plurality of parallel wires like the power feed element units 6a to 6d shown in FIG. 2 and FIG. 3. Cutting-time-wafer supporting sections 15a and 15b control behaviors of approaching and separating from a crystal ingot 5I, which is a workpiece. Components other than the power feed element units 6a to 6d are substantially the same as the wire electric discharge machining apparatus in the first embodiment. Explanation of the components is omitted. The same components are denoted by the same reference numerals and signs.

In the power feed element units 6a to 6d shown in FIG. 7, when power feed portions are worn by sliding with the cutting wire sections CL, the power feed portions have to be replaced together with the entire power feed element unit. However, if the cutout sections 6R are machined at every 90 degrees from the cutout sections of the power feed element units 6a to 6d shown in FIG. 7, one power feed element unit can include the power feed sections 6T equivalent to four times of replacement. Note that, concerning this power feed element unit, both shaft ends thereof are machined in a regular M-polygonal shape (M is the number of cutout sections 6R on the circumference) having the number of surfaces same as the number of cutout sections 6R. A power-feed-element-unit-shaft-end fitting section of a power feed element holder that holds the power feed element unit also contains a regular M-polygonal hole having the same shape corresponding to the power feed element unit.

When electric discharge machining is performed, after disposing the crystal ingot 5I formed by a pull-up method or the like, which is a workpiece, to be opposed to the cutting wire sections CL at a predetermined inter-pole distance apart therefrom while rotating the main guide rollers 1c and 1d to cause the wire 3 to travel, a voltage pulse is applied to the cutting wire sections CL to lift the stage 9 according to cutting speed. By relatively moving the parallel wire sections PS and the crystal ingot 5I in a state in which the inter-pole distance is kept fixed, as in a state during machining shown in FIG. 8(a), arc discharge is continued. The machining grooves G are formed to correspond to routes of passage of the cutting wire sections CL in the crystal ingot 5I. Therefore, as shown in FIG. 8(b), the thickness $t_0$ of the wafer 5W to be sliced is length obtained by subtracting the width (machining width) $t_1$ of the machining grooves, which is a cutting margin of the crystal ingot 5I, from the winding pitch $t_p$. A wire line diameter is desirably small to reduce the machining width. Practically, a steel wire of approximately 0.1 millimeter is often used. However, a steel wire further reduced in diameter to 0.05 millimeters or the like is sometimes used. Further, to make a discharge start voltage appropriate, coating of brass or the like can be applied to the surface of the steel wire.

With the wire electric discharge machining apparatus in this embodiment, it is possible to easily manufacture the highly accurate wafer 5W from the crystal ingot 5I using the power feed element units 6a to 6d.

The wire electric discharge machining is particularly effective for a material having high hardness because machining speed does not depend on the hardness of a workpiece. As the workpiece 5, for example, metal such as tungsten and molybdenum set as sputtering targets, ceramics such as polycrystalline silicon carbide used as various structure members, semiconductor materials such as monocrystal silicon, monocrystal silicon carbide, and gallium nitride formed as wafer substrates for semiconductor device manufacturing, and monocrystal or polycrystal silicon formed as a wafer for a solar cell can be used. In particular, concerning the silicon carbide and the gallium nitride, because hardness is high, there is a problem in that productivity is low and machining accuracy is low in a system by a mechanical wire saw. According to this embodiment, it is possible to manufacture wafers of silicon carbide and gallium nitride while attaining both of high productivity and high machining accuracy.

As explained above, the wire electric discharge machining apparatus in this embodiment includes the one wire 3 that is wound, while being spaced apart at a fixed pitch, a plurality of times between a pair of guide rollers disposed in parallel at intervals, travels according to rotation of the guide rollers, and forms parallel wire sections PS spaced apart from each other between the pair of guide rollers and the power feed elements that are provided between the guide rollers, and respectively come into contact with the parallel wire sections PS to feed power. The power feed elements for coming into contact with each of the parallel wires and feeding power are integrated for each alignment unit. The power feed elements (the power feed element units 6a to 6d) are aligned to correspond to the wire parallel arrangement interval of the cutting wire sections CL set as the power feed targets. The machining power supply feeds power to the power feed element units 6a to 6d disposed to feed power to the cutting wire sections CL with an interval of every three cutting wire section.

Note that, in the first and second embodiments, the two driving main guide rollers are used. However, one of the driving main guide rollers can be changed to a driven main guide roller. However, because maximum tension of a wire is determined according to the sectional area of the wire, when a filament wire is used for reducing machining width, it is desirable to reduce tension (internal stress) applied to the wire using a plurality of driving guide rollers. By preventing the tension of the wire from becoming excessively large, it is possible to increase the number of windings, thin the wire, and attain improvement of productivity.

In the first and second embodiments, the example is explained in which the one wire 3 is wound on the four main guide rollers. However, it is also possible to adopt, for example, a configuration in which three main guide rollers are disposed. Besides, the wire electric discharge machining apparatus is not limited to the embodiments. A specific configuration of the wire electric discharge machining apparatus is not particularly limited as long as the parallel wire sections PS are formed by repeatedly folding back the one wire 3.

As explained above, with the configurations in the first and second embodiments, the wire electric discharge machining apparatus includes the one wire that is wound a plurality of times around the main guide rollers while being spaced apart at the fixed pitch and travels according to the rotation of the main guide rollers, the parallel wire sections PS arrayed between the main guide rollers 1c and 1d, and the integrally molded power feed element units 6a, 6b, 6c, and 6d that feed power to the respective wires 3 of the parallel wire sections PS. The wires 3 stretched between the damping guide rollers 7a and 7b are formed as the cutting wire sections CL opposed to the workpiece 5. Therefore, power is surely fed to the parallel wire sections PS from the machining power supply 10, whereby highly accurate wire electric discharge machining can be performed.

Because the power feed element units 6a, 6b, 6c, and 6d are integrally molded, alignment accuracy of the power feed portions in contact with the wires is extremely satisfactory. Further, because the power feed element units 6a, 6b, 6c, and 6d can be aligned without necessity of fine adjustment of power feed element positions by fitting the power feed element units 6a, 6b, 6c, and 6d in the power feed element holders 60a and 60b, a plurality of wires can be easily surely brought into contact with the respective power feed elements. Therefore, there is an effect that the wires do not come off the power feed elements during machining and it is possible to reduce a machining preparation time. Further, as fine adjustment of a push-in amount of the power feed element units 6a, 6b, 6c, and 6d against the parallel wire sections PS is unnecessary, it is made possible to make contact lengths of the wires uniform. Therefore, there is an effect that fluctuation in an electric discharge machining current is eliminated and electric discharge machining is stabilized. With the configuration explained above, there is an effect that it is possible to stabilize power feed to the cutting wire sections CL, perform stable electric discharge machining even in machining for a long time, and manufacture a plurality of wafers with small thickness fluctuation at one time.

By using the wire electric discharge machining apparatus that attains the effects, it is possible to cut the crystal ingot 5I, which is the workpiece including the hard material such as silicon carbide, in a thin plate shape with high productivity and form a semiconductor wafer.

Further, in this embodiment, according to specifications, cutting of a columnar ingot is started in a state in which an orientation flat portion is faced up. Note that it is confirmed by an experiment that machining is not affected by an orientation flat position. A setting state of the ingot can be a state in which the orientation flat portion is faced up as shown in FIG. 6. The setting state is not limited by a setting direction of the ingot.

Third Embodiment

Figure 9:
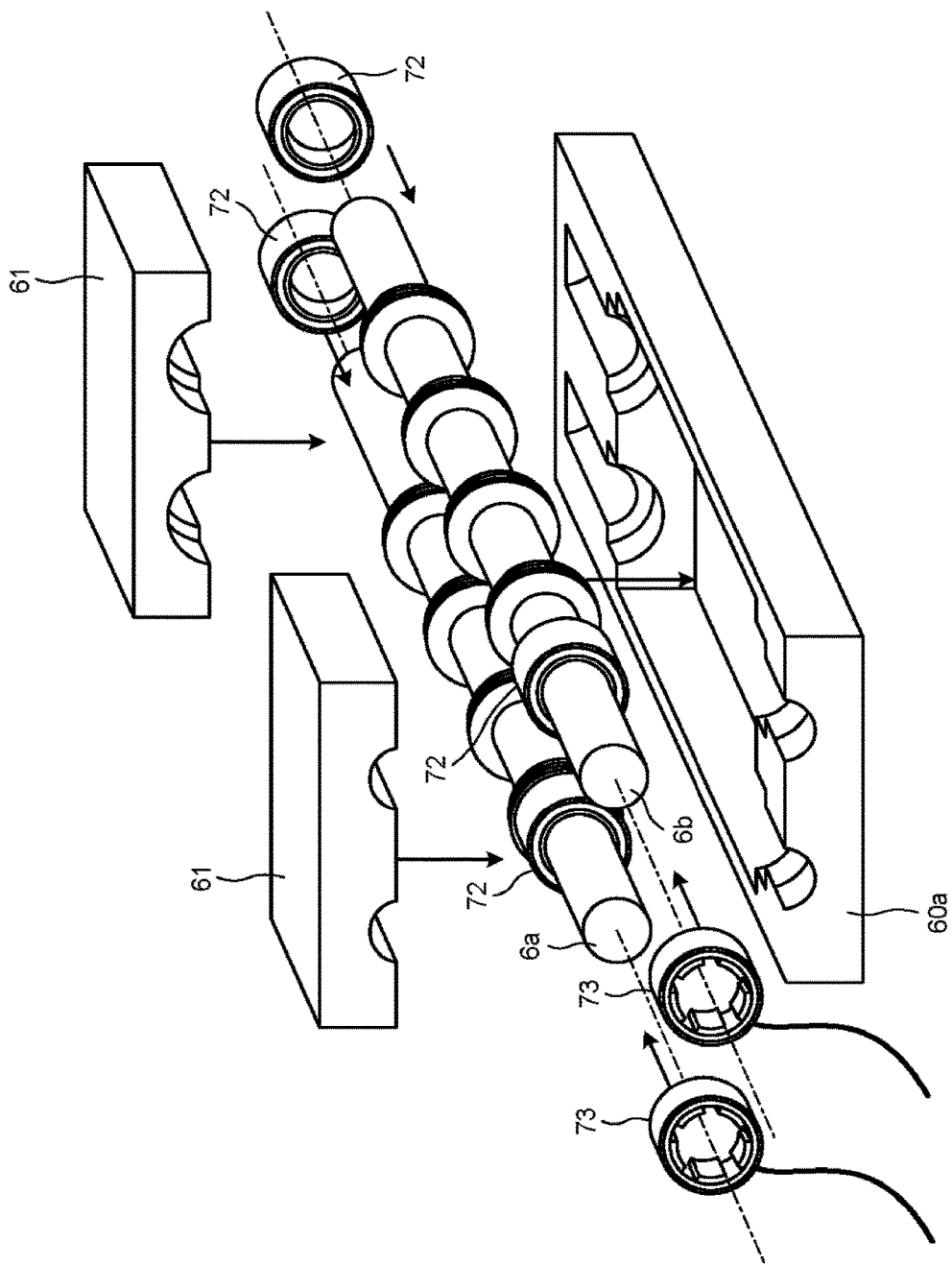
FIG. 9 is a configuration diagram showing components and the structure of a power feed element portion of a wire electric discharge machining apparatus in a third embodiment of the present invention.

A configuration and an operation in a third embodiment of the present invention are explained below. FIG. 9 is a perspective view showing the configuration of the power feed element units 6a and 6b, the power feed element holder 60a in which the power feed element units 6a and 6b are fit, and related components of the power feed element holder 60a of a wire electric discharge machining apparatus according to the third embodiment of the present invention. The power feed element units and the power feed element holders in this embodiment include a large number of components and operations same as those in the first embodiment. Therefore, explanation is omitted concerning the components and the operations. Components and operations different from those in the first embodiment are explained. First, the configuration around power feed elements in the third embodiment is explained. The shape of both the shaft ends of the power feed element units 6a to 6d is formed in a columnar shape. In portions of the power feed element holders 60a and 60b in which both the shaft ends of the power feed element units 6a to 6d are fitted, bearing sections machined in a semicircular shape slightly larger than a diameter same as the diameter of the shaft ends of the power feed element units 6a to 6d are machined, and the power feed element units 6a to 6d are set in these bearing sections. Since the power feed element fixture 61 is also machined to be semicircular portions of the same shape, both the shaft ends of the power feed element units 6a to 6d are supported to be held by the semicircular portions. Further, slip rings 73 are attached to the shaft ends of the power feed element units 6a to 6d. Brushes present on the inner surfaces of the slip rings 73 are in contact with the shaft outer circumferential surfaces of the power feed element units 6a to 6d. Power feed lines from a machining power supply (not shown in the figure) are connected to the slip rings 73. In FIG. 9, the power feed element holder 60a for housing the power feed element units 6a and 6b is shown in detail. However, the power feed element holder 60b for housing the power feed element units 6c and 6d has the same structure.

Next, an operation is explained. Both the shaft ends of the power feed element units 6a to 6d built in the power feed element holders 60a and 60b are formed in a columnar shape. Portions equivalent to supporting portions of both the shafts are also formed in a columnar shape. Therefore, the power feed element units 6a to 6d can rotate with the axial direction as a rotation center. Therefore, when the wire 3 is caused to travel in a state in which the parallel wire sections PS are laid in grooves of respective power feed sections of the power feed element units 6a to 6d, while the parallel wire sections PS come into contact with the power feed element units 6a to 6d, the power feed element units 6a to 6d rotate together with the wire traveling with a frictional force of the contact. Further, the slip rings 73 has a function of feeding power to rotating shafts having a columnar shape. Therefore, an electric current from the machining power supply 10 is fed from the shaft ends of the power feed element units 6a to 6d to the power feed elements of the power feed element units via the brushes of the slip rings 73, and a machining current is supplied to the parallel wire sections PS (the cutting wire sections CL).

Roller bearings 72 are provided in the portions that support both the shaft ends of the power feed element units 6a to 6d. The power feed element units 6a to 6d are supported by the roller bearings 72, whereby the rotation of the power feed element units 6a to 6d can be further smoothed. Therefore, because the power feed element units 6a to 6d easily rotate with a frictional force due to the contact of the parallel wire sections PS, it is made possible to maintain a stable rolling friction state for a long time without causing a difference between the traveling speed of the parallel wire sections PS and the rotating speed of the power feed element units 6a to 6d. In this case, the roller bearings 72 are desirably nonconductive materials such as ceramic balls to prevent electric discharge occurrence among the balls configuring the bearings.

With the structure explained above, the power feed portions of the power feed element units 6a to 6d for feeding power to the parallel wire sections are no longer in a state of sliding frictions with the parallel wires as in the first embodiment, but change to a state of rolling friction by rotating together with the traveling of the power feed target wire. Therefore, the power feed surfaces of the power feed element units 6a to 6d are not worn by the cutting wire sections CL, to which a hard substance adheres or the surface roughness of which is worsened due to repeated use for electric discharge machining, traveling while sliding in the power feed element portions. The life of the power feed element units 6a to 6d is extended, and it is made possible to stably perform the electric discharge machining.

By adopting the apparatus configuration explained above, the power feed to the cutting wire sections CL from the machining power supply 10 is stabilized for a long time. Thus, it is made possible to maintain stable electric discharge machining, and it is also made possible to slice a plurality of wafers having the same plate thickness from the workpiece 5 at a time.

Note that, for the power feed to the power feed element units 6a to 6d, for example, slip rings, brushes, or the like only have to be brought into contact with both the shaft ends of the power feed element units 6a to 6d projected from the bearing sections of the power feed element holders 60a and 60b. At this point, to prevent the bearings from being damaged by electric discharge that occurs inside the bearings, it is desirable from the viewpoint of extension of component lives that the bearings in use are roller bearings configured by nonconductive materials such as ceramic balls.

As explained above, the friction due to the sliding of the traveling cutting wire sections CL is changed to the rolling friction by setting the bearing to enable the power feed element units 6a to 6d to smoothly rotate around the axis centers thereof. Consequently, because the friction of the power feed surfaces of the power feed element units 6a to 6d is substantially reduced, there is an effect that the electric discharge machining is stabilized for a long time and machining accuracy is improved.

The power feed element units 6a to 6d rotate according to the wire traveling. Therefore, the wire contact surfaces of the power feed element units 6a to 6d, that is, the power feed surfaces are not worn by friction. Rather than the very hard material such as the cemented carbide alloy, metal materials that are easily cut such as steel, copper, brass, and aluminum can also be used as the power feed element units, and thus, it is made possible to continue stable electric discharge for a long period.

In the three embodiments explained above, the two power feed element units are provided on each of both the surfaces across the workpiece 5. However, the present invention is also applicable when one power feed element unit is attached on each of both the sides.

In the case of a structure in which power can be fed from power feed element rows, one each of which is disposed on each of both the sides of the ingot, to all the wires, there is an effect that fluctuation in machining groove width is reduced and accordingly, fluctuation in wafer plate thickness is reduced. That is, when power is fed only from the power feed elements disposed on one side of the ingot, because a halfway resistance value fluctuates because of a difference in the distance from the power feed elements to an electric discharge position of the ingot, a discharge current also changes. Therefore, a machining amount by the electric discharge machining is different according to the distance from the power feed elements to a machining point. The machining groove width during the ingot machining tends to be larger in a portion closer to the power feed elements and smaller in a portion further away from the power feed elements. This tendency is particularly noticeable in an ingot having a large aperture. On the other hand, in collective power feed, power is fed from the power feed element rows, one each of which is disposed on each of both the sides of the ingot, to the wires. Consequently, the difference in the distance from the power feed elements to the discharge position decreases, a loss of the discharge current is reduced, a difference in the machining amount is reduced, and fluctuation in the machining groove width, that is, fluctuation in the wafer plate thickness is reduced.

The several embodiments of the present invention are explained above. However, these embodiments are presented as examples and are not intended to limit the scope of the invention. These new embodiments can be implemented in other various forms. Various omissions, substitutions, and changes can be made in a range not departing from the spirit of the invention. These embodiments and modifications thereof are included in the scope and the gist of the invention and are included in the inventions described in claims and a scope of equivalents of the inventions.

REFERENCE SIGNS LIST 1a, 1b, 1c, 1d Main guide rollers
2 Wire bobbin
3 Wires
CL Cutting wire sections
PS Parallel wire sections
4 Wire winding bobbin
5 Workpiece
51 Crystal ingot
5W Wafer
6a, 6b, 6c, 6d Power feed element units
6M Shaft section
6S Power feed sections
7a, 7b Damping guide rollers
8a, 8b Nozzles
9 Stage
10 Machining power supply
60a, 60b Power feed element holders
61 Power feed element fixture
6R Cutout sections
6T Power feed sections
72 Roller bearings
73 Slip rings (Power feed brushes)

The invention claimed is:

1. A wire electric discharge machining apparatus comprising:
a pair of guide rollers in parallel at intervals;
one wire wound a plurality of times around the pair of guide rollers while being spaced apart at a fixed pitch, the one wire traveling according to rotation of the guide rollers and forming a plurality of parallel wire sections spaced apart from each other between the pair of guide rollers;
a pair of damping guide rollers provided between the pair of guide rollers, the pair of damping guide rollers respectively following and coming into contact with the parallel wire sections to form damped cutting wire sections;
a plurality of power feed element units, each of the plurality of power feed element units includes a plurality of power feed elements aligned to correspond to a wire parallel arrangement interval of the cutting wire sections set as power feed targets, the power feed elements respectively coming into contact with the parallel wire sections and feeding power, the power feeding elements adjacent to each other being arrayed to feed power to the parallel wire sections with an interval of at least every other parallel wire section so that two adjacent parallel wire sections receive the power from the power feed element units different from each other; and
a machining power supply to apply a voltage between a workpiece and the wire to cause electric discharge,
wherein the power feed elements aligned in the same power feed element units are electrically connected to each other,
wherein a first of the plurality of power feed element units is provided between a first one of the pair of guide rollers and a first one of the pair of damping guide rollers, and a second of the plurality of power feed element units is positioned between a second one of the pair of guide rollers and a second one of the pair of damping guide rollers, and
wherein the power feed element units include power feed element holders, each of which includes shaft-end supporting sections at both ends, and are capable of controlling positions of the power feed elements.

2. The wire electric discharge machining apparatus according to claim 1, wherein
each of the power feed element units includes a shaft section, which is a columnar portion having a small diameter, and power feed sections that are formed at a predetermined interval in the shaft section, each having a diameter larger than the diameter of the shaft section, and having a groove for wire guide on an outer circumferential surface, and
a contact surface of each of the power feed elements with the wire can be changed by rotating supporting positions of end portions of the shaft section.

3. The wire electric discharge machining apparatus according to claim 2, wherein
ends of the shaft section of each of the power feed element units are machined in a regular polygonal prism, and
the shaft-end supporting sections of the power feed element holders that support the power feed element units are also bored in a regular polygonal prism.

4. The wire electric discharge machining apparatus according to claim 2, wherein each of the power feed element units includes roller bearings in the shaft end supporting sections and is rotatable.

5. The wire electric discharge machining apparatus according to claim 4, wherein
a slip ring or a power feed brush is provided at shaft ends of each of the power feed element unit, and
power is fed from the machining power supply to the power feed brush.

6. The wire electric discharge machining apparatus according to claim 1, wherein the power feed element units are disposed to extend over an entire array width direction of the parallel wire section and are distributed at an equal interval such that all the power feed elements do not have an overlapping portion in an axis direction of the entire power feed element units.

7. The wire electric discharge machining apparatus according to claim 6, wherein the power feed element units are configured by four power feed element units, and the power feed elements configuring each of the power feed element units feed power to the parallel wire sections with an interval of every three parallel wire section.

8. The wire electric discharge machining apparatus according to claim 1, wherein the power feed elements are integrally molded in each respective power feed element unit.

9. A manufacturing method for a thin plate, the method comprising:

winding one wire a plurality of times around a pair of guide rollers in parallel at intervals while being spaced apart at a fixed pitch, the one wire traveling according to rotation of the guide rollers and forming a plurality of parallel wire sections spaced apart from each other between the pair of guide rollers;

forming a damped cutting wire section with a pair of damping guide rollers provided between the pair of guide rollers, the pair of damping guide rollers respectively following and coming into contact with the parallel wire sections;

aligning a plurality of power feed element units, each including a plurality of power feed elements, to correspond to a wire parallel arrangement interval of the cutting wire sections set as power feed targets, the power feed elements respectively coming into contact with the parallel wire sections and feeding power, wherein a first of the plurality of power feed element units is provided between a first one of the pair of guide rollers and a first one of the pair of damping guide rollers, and a second of the plurality of power feed element units is positioned between a second one of the pair of guide rollers and a second one of the pair of damping guide rollers, wherein the power feed element units include power feed element holders, each of which includes shaft-end supporting sections at both ends, and are capable of controlling positions of the power feed elements;

arraying the power feed elements adjacent to each other to feed power to the parallel wire sections with an interval of at least every other parallel wire section so that two adjacent parallel wire sections receive the power from the power feed element units different from each other;

applying a voltage between a workpiece and the wire with a machining power supply to cause electric discharge;

electrically connecting the power feed elements aligned in the same power feed element units to each other;

collectively feeding power to the power feed element units from the machining power supply; and manufacturing a plurality of the thin plates from a workpiece.

10. A manufacturing method for a semiconductor wafer, the method comprising:

winding one wire a plurality of times around a pair of guide rollers in parallel at intervals while being spaced apart at a fixed pitch, the one wire traveling according to rotation of the guide rollers and forming a plurality of parallel wire sections spaced apart from each other between the pair of guide rollers;

forming a damped cutting wire section with a pair of damping guide rollers provided between the pair of guide rollers, the pair of damping guide rollers respectively following and coming into contact with the parallel wire sections;

aligning a plurality of power feed element units, each including a plurality of power feed elements, to correspond to a wire parallel arrangement interval of the cutting wire sections set as power feed targets, the power feed elements respectively coming into contact with the parallel wire sections and feeding power, wherein a first of the plurality of power feed element units is provided between a first one of the pair of guide rollers and a first one of the pair of damping guide rollers, and a second of the plurality of power feed element units is positioned between a second one of the pair of guide rollers and a second one of the pair of damping guide rollers, wherein the power feed element units include power feed element holders, each of which includes shaft-end supporting sections at both ends, and are capable of controlling positions of the power feed elements;

arraying the power feed elements adjacent to each other to feed power to the parallel wire sections with an interval of at least every other parallel wire section so that two adjacent parallel wire sections receive the power from the power feed element units different from each other;

applying a voltage between a workpiece and the wire with a machining power supply to cause electric discharge;

electrically connecting the power feed elements aligned in the same power feed element units to each other;

collectively feeding power to the power feed elements from the machining power supply; and manufacturing a plurality of the semiconductor wafers from a semiconductor material.

* * * * *